June 29, 1954  D. W. KELBEL  2,682,177
TRANSMISSION AND CONTROL MECHANISM THEREFOR
Filed Dec. 20, 1947  7 Sheets-Sheet 1
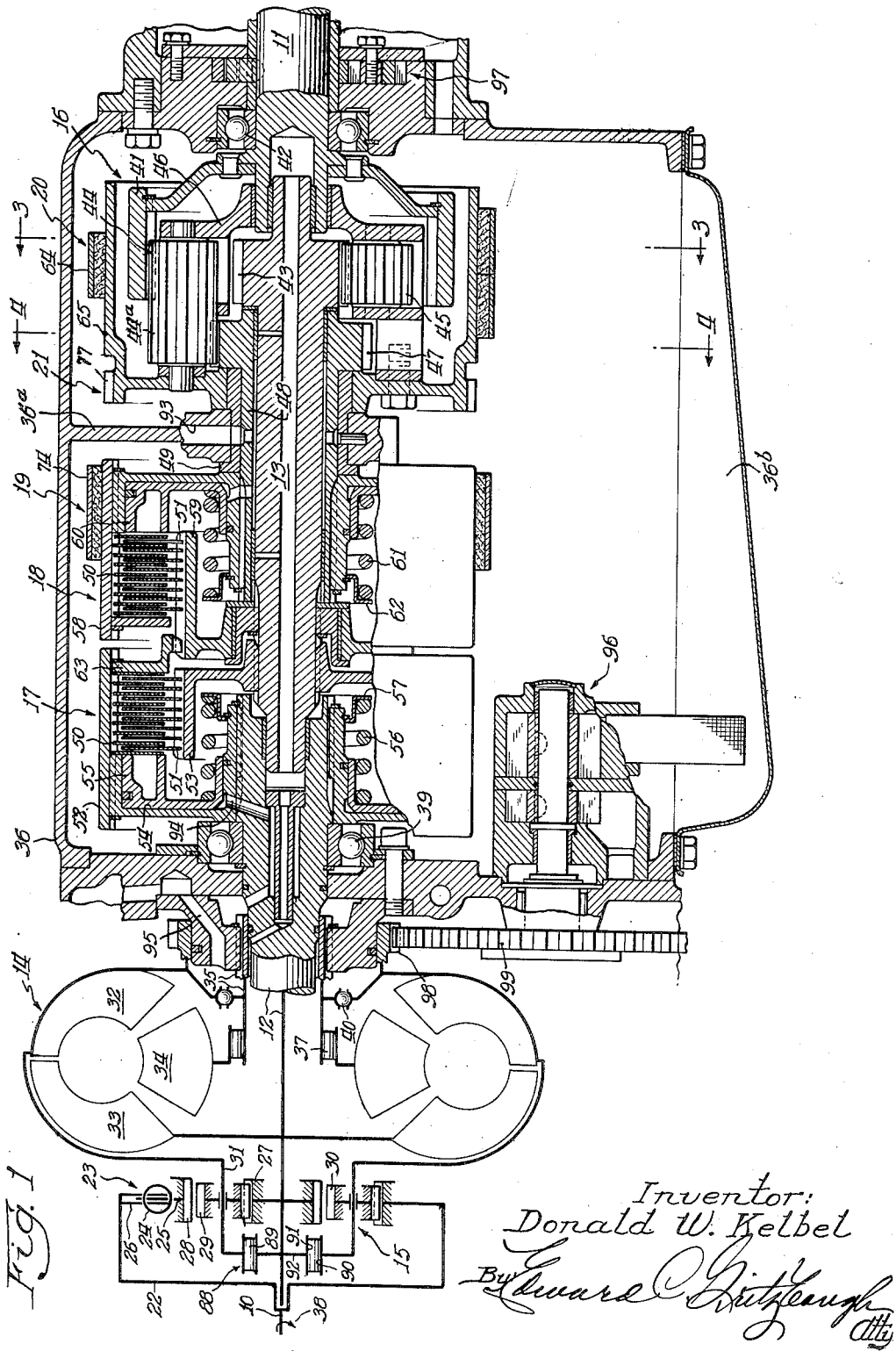
Inventor:
Donald W. Kelbel
By Edward ........
Atty

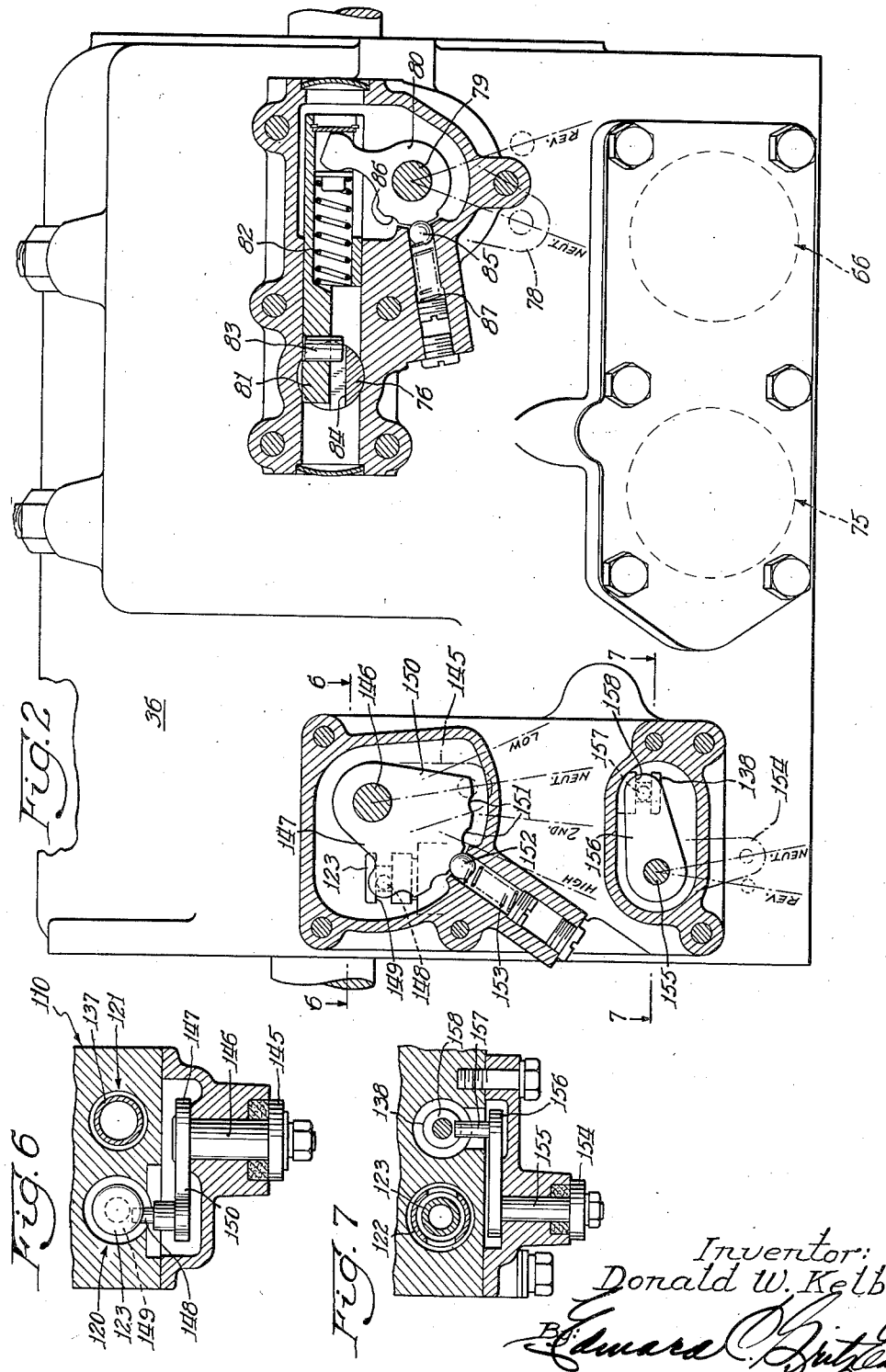

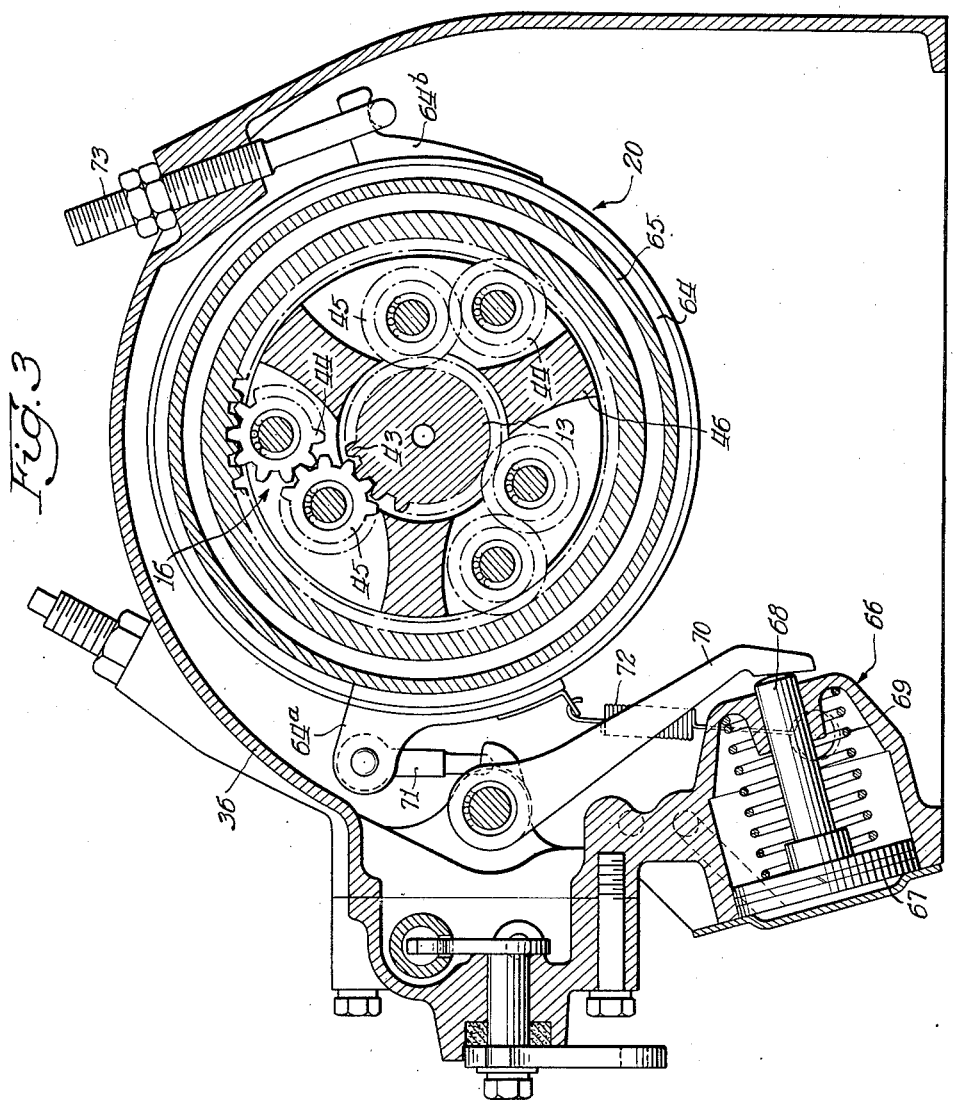

June 29, 1954  D. W. KELBEL  2,682,177
TRANSMISSION AND CONTROL MECHANISM THEREFOR
Filed Dec. 20, 1947  7 Sheets-Sheet 4
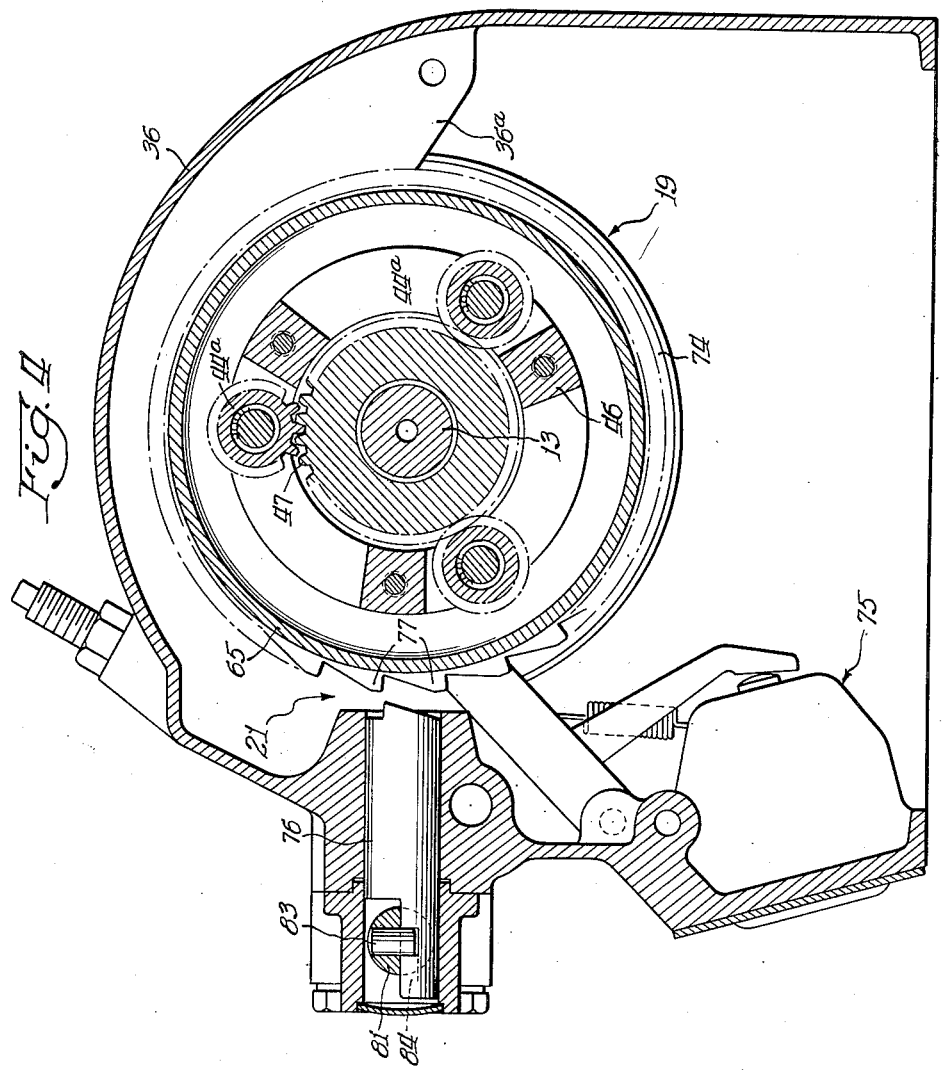
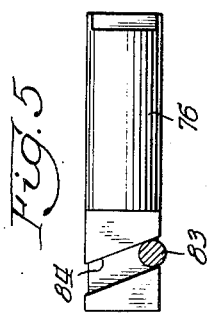
Inventor:
Donald W. Kelbel
By Edward C. Fitzhugh
Atty.

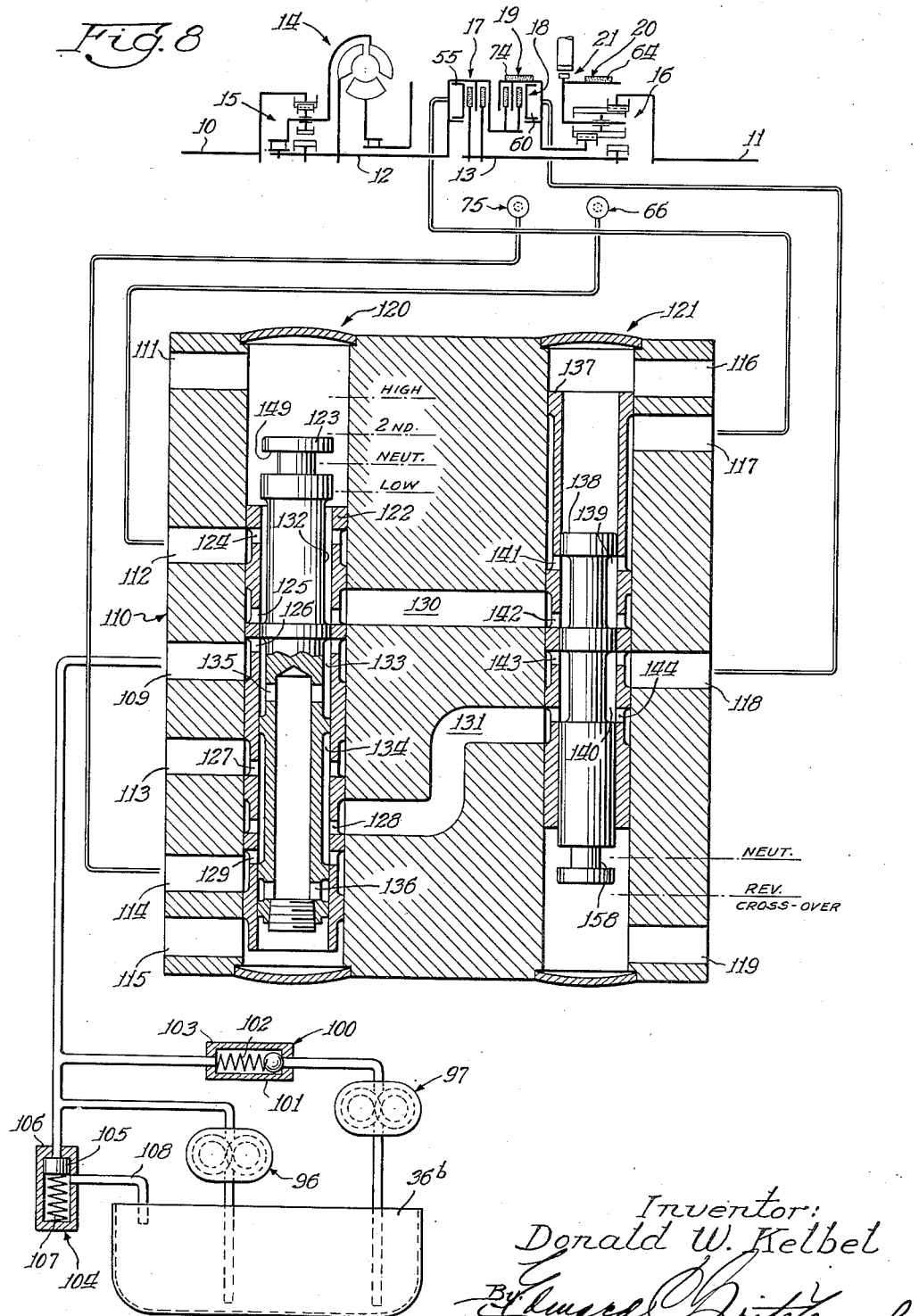

June 29, 1954   D. W. KELBEL   2,682,177
TRANSMISSION AND CONTROL MECHANISM THEREFOR
Filed Dec. 20, 1947   7 Sheets-Sheet 6
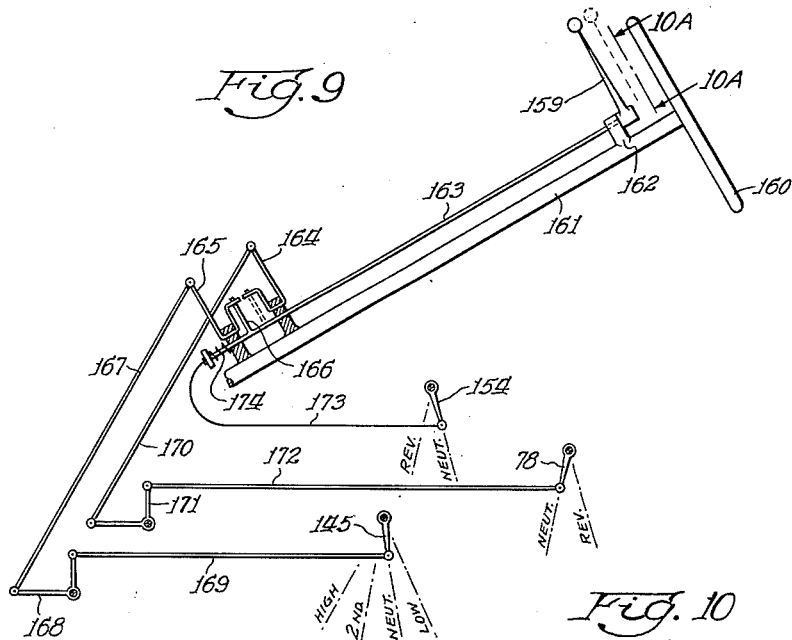
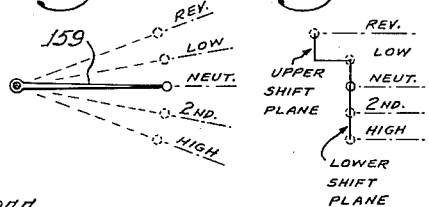
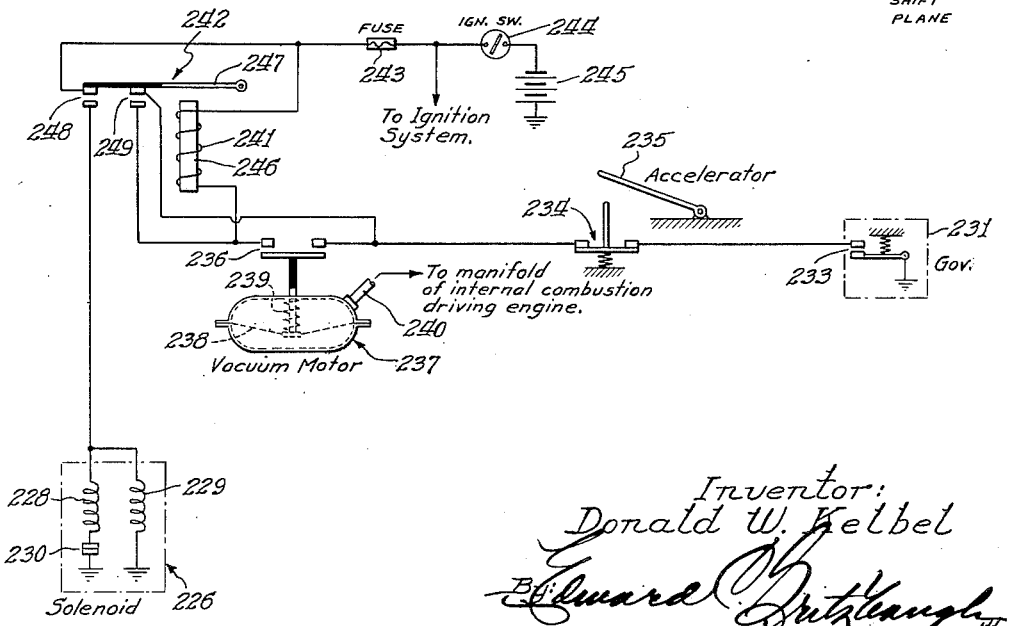
Inventor:
Donald W. Kelbel

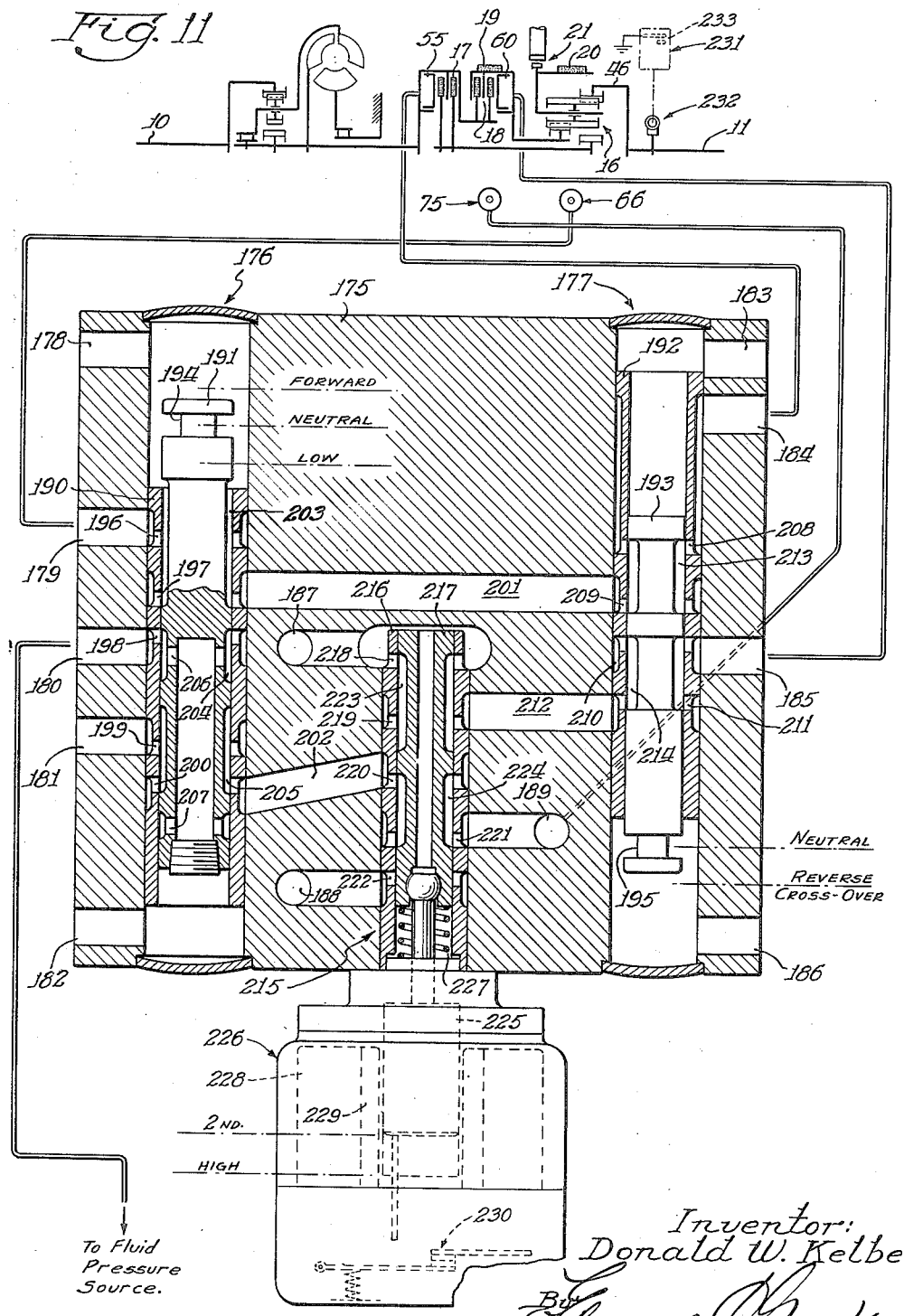

Patented June 29, 1954

2,682,177

UNITED STATES PATENT OFFICE 2,682,177

TRANSMISSION AND CONTROL MECHANISM THEREFOR

Donald W. Kelbel, Muncie, Ind., assignor to Borg-Warner Corporation, Chicago, Ill., a corporation of Illinois Application December 20, 1947, Serial No. 793,006

15 Claims. (Cl. 74—472)

My invention relates to transmissions for automotive vehicles and more particularly to such transmissions which comprise hydrodynamic torque converters.

Such transmissions often comprise a planetary gear set which is utilized for providing a reduced speed drive through the transmission and a reverse drive as well. The gear set has a reaction element, and this reaction element is braked in order to complete the power trains, both forward and reverse. A friction brake may be utilized for braking this reaction element and such a friction device provides a desirable gradual completion of the power trains when gradually engaged; however, the reaction on this element of the gear set is greater for reverse drive than it is for forward, and it is an object of my invention to provide mechanism for taking this greater reaction in reverse drive while still providing for gradual completion of the power trains by means of such a friction brake.

It is accordingly an object of my invention to provide a positive brake for this reaction element which functions to take the increased reaction on the element in reverse drive.

It is another object of my invention to provide a manual shift lever for completing the various power trains through the transmission with the lever arrangement being such that the lever is movable in one plane from a neutral position to a forward speed position and is thence movable in another plane to complete the reverse drive with the friction brake for the reaction element only being applied and is thence movable in a plane parallel to the first plane for applying the positive brake.

It is another object of the invention to provide such an arrangement in connection with a transmission having three forward speed ratios and a reverse drive with the transmission being shifted to either its low or intermediate speeds forward by means of the shift lever being moved in the first plane above mentioned. It is contemplated that a mechanism shall be provided under the control of the accelerator for the vehicle for upshifting and downshifting the transmission between its intermediate and high speed ratios.

The invention consists of the novel constructions, arrangements and devices to be hereinafter described and claimed for carrying out the above stated objects and such other objects as will appear from the following description of preferred embodiments of the invention, with reference being made to the accompanying drawings, in which:

Fig. 1 is a longitudinal sectional view of a transmission embodying the principles of the invention;

Fig. 2 is a side elevational view of the transmission, partly in section;

Fig. 3 is a sectional view taken on line 3—3 of Fig. 1;

Fig. 4 is a sectional view taken on line 4—4 of Fig. 1;

Fig. 5 is a plan view of the sprag forming part of the positive brake hereinabove referred to;

Fig. 6 is a sectional view taken on line 6—6 of Fig. 2;

Fig. 7 is a sectional view taken on line 7—7 of Fig. 2;

Fig. 8 is an illustration partly in section and partly schematic of the hydraulic controls for the transmission;

Fig. 9 is a schematic illustration of the manual controls for conditioning the transmission for its various speed ratios;

Fig. 10 is an illustration of the paths of travel of the manual control lever which is illustrated in Fig. 9;

Fig. 11 is an illustration similar to Fig. 8 but of a modification of the invention; and Fig. 12 is a diagram showing the electrical arrangement used with the hydraulic controls illustrated in Fig. 11.

Like characters of reference designate like parts in the several views.

Referring now to the drawings and to Fig. 1 in particular, the illustrated transmission comprises in general an input or drive shaft 10, an output or driven shaft 11, an intermediate shaft 12 and a second intermediate shaft 13. The transmission is intended to be useful particularly with automotive vehicles, and the input shaft is intended to be connected with a driving engine (not shown) of such a vehicle, and the output shaft 11 is intended to be connected with the drive wheels (not shown) of the vehicle.

The input shaft is connected to drive a hydrodynamic torque converter 14 by means of a planetary speed-up gearing 15. The shaft 12 is driven by the torque converter and is adapted to drive a planetary gear set 16. A pair of friction clutches 17 and 18 are provided for selectively connecting the shaft 12 with different elements of the gear set 16, and friction brakes 19 and 20 are provided for braking certain elements of the gear set to provide reaction members in the gear set. A positive type brake 21 is also provided for use along with the brake 20 for augmenting the effect of the brake 20, as will be described hereinafter in greater detail.

The input shaft 10 drives a flywheel 22, and the flywheel is connected to the speed-up gearing 15 by means of a vibration dampener 23. The vibration dampener comprises springs 24 acting between opposite parts 25 and 26, and the type of dampener shown is well known in the art and therefore need not be described more in detail.

The planetary gear set 15 comprises a sun gear 27, a ring gear 28, and a pair of planet gears 29 and 30. The planet gears 29 and 30 are in mesh with each other, and the gear 30 is also in mesh with the ring gear 28, and the gear 29 is also in mesh with the gear 27. The planet gears 28 and 29 are rotatably mounted on a planet gear carrier 31. The ring gear 28 is connected to be driven by the vibration dampener 23, and the sun gear 27 is splined to the intermediate shaft 12. The planet gear carrier 31 is connected with the torque converter 14, as will hereinafter be described in greater detail.

The torque converter 14 comprises a vaned impeller or driving element 32, a vaned rotor or driven element 33, and a vaned stator or reaction element 34. The impeller 32 is connected to the planet gear carrier 31 of the gear set 15, and the rotor 33 is splined to the shaft 12. The stator 34 is rotatably disposed on a central hub 35 which is fixed with respect to the casing 36 of the transmission. A one-way roller brake 37 is provided between the hub 35 and the stator 34 for allowing the stator to rotate only in the forward direction, that is, in the same direction as the shaft 10 is driven, this direction being indicated by the arrow 38. Such brakes are well known in the art and the brake 37 thus will not be described further in detail herein. The intermediate shaft 12 is rotatably disposed with respect to the casing 36 by means of a bearing 39, and this shaft is piloted in the drive shaft 10 as shown. The impeller 32 is rotatably disposed on the central hub 35 by means of a bearing 40 as will be noted.

The planet gear set 16 comprises a ring gear 41 connected with the output shaft 11, and as will be noted, the ring gear and output shaft are rotatably disposed within the casing 36 by means of a bearing 42. The gear set also includes a sun gear 43 formed on the shaft 13 which, as will be noted, is piloted within the shafts 11 and 12. A pair of planet gear pinions 44 and 45 in mesh with each other are provided, and the gear 44 is also in mesh with the ring gear 41, and the gear 45 is also in mesh with the sun gear 43. The gears 44 and 45 are rotatably mounted on a planetary gear carrier 46 which is rotatably disposed with respect to the shafts 11 and 13. The pinion gear 44 is provided with a gear portion 44a which extends forwardly of the transmission with respect to that portion of the gear in mesh with the gear 45, and a sun gear 47 is provided in mesh with the gear portion 44a. The sun gear 47 is formed on a shaft 48 which is rotatably disposed on the intermediate shaft 13. It is to be noted that the carrier 46 is rotatably mounted with respect to the shaft 48 by means of an intermediate collar 49, and this collar is supported by a portion 36a of the casing 36.

The friction clutch 17 is provided for drivingly connecting the shaft 13 with the shaft 12 and comprises a plurality of friction plates 50 and 51. The clutch comprises an outer shell 52 to which the plates 50 are splined and an inner shell 53 to which the plates 51 are splined. The outer shell 52 is splined to the shaft 12, and the inner shell 53 is splined to the shaft 13. The outer shell 52 is provided with an annular cavity 54 in which a piston 55 of the same general shape is disposed. The piston is adapted to be moved by fluid under pressure applied thereto as will be henceforth more fully described so as to move the friction plates 50 and 51 together for engaging the clutch 17. A spring 56 is provided between the piston and a collar 57 fixed to the shell 52, and this spring functions to move the piston 55 into its retracted position in which it is shown in the drawings.

The clutch 18 is generally similar to the clutch 17 and comprises an outer shell 58, an inner shell 59, clutch plates 50 and 51 splined respectively to the outer and inner shells, a fluid pressure operated piston 60, a spring 61 acting on the fluid piston, and a retainer collar 62 for the spring. The outer shell 58 is splined to the shaft 48, and the inner shell 59 fits on and is rotatably disposed with respect to the shaft 13. A bridging member 63 is provided for connecting the outer shell 52 of the friction clutch 17 with the inner shell 59 of the friction clutch 18 so that these two parts rotate together, and the friction plates 50 of the clutch 17 and the friction plates 51 of the clutch 18 act as the driving plates in the respective clutches.

The friction brake 20 comprises a brake band 64 which acts on a drum 65 connected with the planet gear carrier 46. The brake band 64 is engaged by means of a fluid pressure motor 66 (see Fig. 3) comprising a piston 67 carrying a plunger 68. A return spring 69 is provided between the casing of the motor 66 and the piston 67 for yieldably holding the piston and plunger in the positions in which they are shown. The plunger acts on a lever 70 pivoted within the transmission case 36 and which in turn acts on a pin 71 connected with one end 64a of the brake band 64. This end 64a of the brake band is also acted on by a spring 72 which connects the transmission case 36 and this end of the band for yieldably holding the brake band retracted. The other end 64b of the brake band 64 is fixed with respect to the transmission case by means of a stud 73. When fluid under pressure is applied to the left side of the piston 67, as seen in Fig. 3, it moves the piston and plunger 68 to the right and causes a counterclockwise rotation of the lever 70. This movement of the lever 70 moves the pin 71 and thereby the end 64a of the band 64 upwardly to engage the band.

The friction brake 19 comprises a brake band 74, and this band may be applied and retracted by mechanism similar to that for the brake band 64. The mechanism for the band 74 may comprise the fluid pressure motor 75 shown generally in Fig. 4.

The positive brake 21 comprises a sprag 76 slidably disposed with respect to the transmission case 36 and engageable with sprag teeth 77 formed on the drum 65. The sprag 76 is moved in and out of engagement with the sprag teeth 77 by means of a lever 78 on the outside of the transmission case and carried by a shaft 79 rotatably disposed with respect to the transmission case. The shaft 79 carries a lever 80, and this lever acts on reciprocable plunger 81 through the medium of a spring 82 disposed within the plunger 81. The plunger 81 carries a pin 83 disposed in a slot 84 in the sprag 76, the action between the pin 83 and slot 84 being such that the sprag 76 is moved into engagement with the teeth 77 whenever the plunger 81 is given a movement to the left as seen in Fig. 2. The lever 80 and thereby the lever 78 connected therewith are yieldably held in either their sprag engaged or sprag disengaged positions by means of poppet mechanism comprising a ball 85 adapted to enter recesses 86 in the lever 80 and acted on by a spring 87.

A one-way roller clutch 88 is provided between the intermediate shaft 12 and the planet gear carrier 31 of the gear set 15. The roller clutch comprises rollers 89 disposed between opposite cam surfaces 90 and 91 formed on the carrier 31 and on a hub member 92 fixed to the shaft 12 respectively. The cam surfaces 90 and 91 are of such shape that when the carrier 31 is rotating in the forward direction and the intermediate shaft 12 is rotating at the same or slower speed in the same direction, the roller clutch is disengaged, but as the shaft 12 is driven (as from the output shaft 11), the clutch engages and rotates the carrier in the forward direction.

A fluid conduit 93 is provided in the transmission case 36 and is connected through the shell 58 and associated parts with the piston 60 for applying fluid thereto. A similar conduit 94 is provided for applying fluid pressure to the rear of the piston 55. A conduit 95 is provided in the case and connected parts for supplying fluid to the hydraulic torque converter 14 from any suitable source (not shown).

The combination of the planetary speed-up gear set 15 and the torque converter 14 are substantially as shown in a patent to Schneider No. 2,333,681, and hence a detailed description of the planetary gear set and torque converter combination is not deemed necessary. Briefly, however, the torque converter 14 functions in all the speed ratios of the gear set 16, which are low, intermediate, and high speed forward and a drive in reverse as will be hereinafter described more fully, to drive the intermediate shaft 12, and this shaft functions as a drive shaft for the planetary gearing 16 in all of the speed ratios. The torque converter 14 is of the usual hydrodynamic type and functions as is well-known to drive its driven element 33 at increased torques in low speed ranges, and it functions as a simple two-element fluid coupling in higher speed ranges. The torque converter is filled with fluid by means of the passage 95 when the converter is driving as will be understood. The stator 34 functions to change the direction of flow of fluid within the converter, and this element functions as a reaction element, being held stationary by the one-way brake 37 in torque converting ranges and the stator rotates along with the impeller and rotor when the converter functions as a simple fluid coupling with the one-way brake 37 overrunning.

The torque converter is driven by means of the planetary speed-up gearing 15. In starting a vehicle in which the transmission is installed, the shafts 11, 12, and 13 are stationary, and since the sun gear 27 is splined to the shaft 12, it also is stationary and rotation of the ring gear 28 by means of the shaft 10 causes a rotation of the carrier 31 and thereby the impeller 32 in the forward direction at a speed greater than the speed of the shaft 10. This is due to the fact that the planet gear set 15 includes the dual pinions 29 and 30 and is in accordance with the operation explained more in detail in the above-mentioned Schneider patent. This causes an increased torque to be transmitted to the driven shaft 12 of the converter at lower speeds of the input shaft 10 than would otherwise be the case if this speed-up gearing were not used. After the shaft 12 and any parts driven thereby begin rotation, the speed of the impeller 32 becomes more nearly equal to the speed of the input shaft 10; and the shafts 10 and 12 and the impeller 32 and rotor 33, together with the parts of the planetary gear set 15, all rotate at substantially the same speed when the converter functions in the higher speed ranges of the shafts 10 and 12 as a simple fluid coupling. When the shaft 12 is driven, there are two paths of power flow, one being through the torque converter 14 and the other being directly through the planet gear set 15.

A neutral condition in the transmission is provided when both of the clutches 17 and 18 and all of the brakes 19, 20 and 21 are disengaged. A neutral condition is also provided if only one of the clutches and none of the brakes or if only the brake 19 or the brakes 20 and 21 are engaged. This is due to the fact that engagement of at least two of the engageable elements (counting the brakes 20 and 21 as a single brake for the purpose of this statement) is necessary for a power train to be completed between the shafts 12 and 11, as will be hereinafter described.

Low speed forward drive is provided by engagement of the clutch 17 and the brake 20, with the clutch 18 and the brake 19 being disengaged. The clutch 17 being engaged connects the shaft 12 with the intermediate shaft 13 and thereby with the sun gear 43. The brake 20 is engaged and thereby holds the planet gear carrier 46 of the gear set 16 stationary, and the gear carrier functions as the reaction element of the gear set. Rotation of the sun gear 43 in the forward direction from the drive shaft 12 causes a rotation of the ring gear 41 and thereby the output shaft 11 in the forward direction at a decreased speed. The sun gear 43 and the ring gear 41 rotate in the same direction due to the fact that the dual planet gear pinions are provided between these gears.

Second or intermediate speed forward drive is provided by disengaging brake 20 and engaging brake 19. The brake 19 functions to hold the sun gear 47 acting on the planet gear portion 44a stationary, and the sun gear thereafter functions as the reaction member of the gear set. Rotation of the sun gear 43 from the drive shaft 12 functions to drive the ring gear 41 in the forward direction at a speed greater than that provided when the brake 20 is engaged, and the planet gear carrier 46 incidentally rotates forwardly at some reduced speed.

Third-speed forward or direct drive is provided by disengaging the brake 19 and engaging the friction clutch 18. The friction clutch 18 when engaged functions to connect the larger sun gear 47 through the inner and outer shells 59 and 58 of the clutch 18, the bridging member 63 and the outer shell 52 of the clutch 17 with the drive shaft 12. The clutch 17, remaining engaged, connects the sun gear 43 with the drive shaft 12 as has been described. Therefore, with both the clutches 17 and 18 being engaged, both sun gears 47 and 43 are connected to the drive shaft 12, and the planet gear set is thereby put into locked-up condition in which none of the parts of the gear set rotates relative to the others and a direct or 1—1 drive is provided between shafts 12 and 11.

Reverse drive is provided by engaging the clutch 18 and the brakes 20 and 21, with the clutch 17 and the brake 19 being disengaged. The shaft 12 by means of the clutch 18 drives the sun gear 47, and the brakes 20 and 21 being engaged, the planet gear carrier 46 functions as the reaction member of the gear set 16. Only the planet gear pinion 44 with its portion 44a is effective between the sun gear 47 and the ring gear 41, and therefore the ring gear 41 and the shaft 11 connected therewith are rotated in the reverse direction at a reduced speed ratio.

The brake band 64 is sufficient for the reaction on the carrier 46 when the transmission drives in low speed forward drive; however, the reaction on the carrier 46 is greater for reverse drive, and therefore the positive brake 21 has been provided to augment the action of the brake 20 for reverse drive. Slippage of the brake 20 in reverse drive is thus avoided.

The input shaft 10 and thereby an engine (not shown) connected therewith may be rotated in the forward direction as for starting the engine, by conditioning the gear set 16 for any of its forward speed drives and then driving the output shaft 11 as by pushing or towing the vehicle in which the transmission is installed. In this case, the drive is not through the torque converter 14 from the shaft 12 to the shaft 10, but rather proceeds through the planet gear set 15 and the one-way clutch 88. The planet gear carrier 31 being connected through this clutch with the shaft 12, and the sun gear 27 of this gear set also being connected with this shaft, complete a locking up of the gear set so that for this direction of drive from the output shaft 11 to the input shaft 10, the shafts 12 and 10 rotate together in a 1-1 drive. It is, therefore, not necessary to drive the shaft 10 and an engine connected therewith for starting purposes through the hydraulic device 14 which inherently has some slip between its driving and driven elements.

The transmission may be hydraulically controlled by means of a hydraulic system now to be described. Two sources of fluid pressure are available for the hydraulic system, these being the front pump 96 and the rear pump 97. The front pump is driven from the impeller 32 by means of gears 98 and 99 as shown, and the rear pump 97 is driven directly from the shaft 11. The pumps may be of any suitable type, the gear type being illustrated. Both of the pumps are connected to draw fluid from the sump 36b of the transmission in the bottom of the case 36. Referring to Fig. 8, it will be observed that the output sides of these pumps are connected together, with the rear pump 97 discharging through a check valve 100 which may comprise a ball 101 acted on by a spring 102 and disposed in a check valve casing 103. The fluid discharged from the two pumps is maintained at a predetermined pressure value by means of a relief valve 104 which comprises a piston 105 slidably disposed in the casing 106 of the valve 104 and acted on by a spring 107. The piston 105 moves against the spring 107 to discharge fluid through a port 108 to the sump 36b when the pressure of the fluid reaches the predetermined value.

The fluid under pressure discharged by the pumps 96 and 97 is directed by suitable conduit to a port 109 in a valve block 110. The valve block also has ports 111, 112, 113, 114, 115, 116, 117, 118 and 119. The ports 111, 113, 115, 116 and 119 are "bleed" ports connected with the sump 36b. The port 112 is connected by suitable conduit with the motor 66 for the brake band 64, and the port 114 is connected to the other friction brake operator 75, the latter being for the friction brake band 74 for the second or intermediate speed drive. The port 117 is connected by suitable conduit to piston 55 for the friction clutch 17 which is utilized for low speed forward drive, and the port 118 is connected by suitable conduit to the other piston 60 which is utilized for engaging the clutch 18 for direct drive, for example.

The valve block 110 has two valves, a low-neutral-second-high valve 120 and a neutral reverse cross-over valve 121. The valve 120 comprises a valve sleeve 122 and a valve piston 123. The sleeve 122 has ports 124, 125, 126, 127, 128 and 129, and these ports are respectively connected with the port 112, a channel 130 in the valve block, port 109, port 113, a channel 131 in the valve block and port 114. The piston 123 has grooves 132, 133 and 134 formed on its outer periphery and the piston has an internal cavity which connects ports 135 and 136 formed in the piston.

The valve 121 comprises a valve sleeve 137 and a valve piston 138. The valve piston 138 is provided with grooves 139 and 140 in its outer periphery. The valve sleeve 137 is provided with ports 141, 142, 143 and 144, and these ports are respectively connected with the port 117, the passage 130, the port 118 and the passage 131.

The valve piston 123 is controlled by means of a lever 145 located on the exterior of the transmission case 36. The lever is connected by means of a shaft 146 with a second lever 147, and the latter lever carries a pin 148 which extends into a groove 149 in the piston 123. Oscillatory movement of the lever 145 thus has the effect of moving the valve 123 between its various positions through the linkage of the parts 146, 147 and 148. The lever 147 is provided with a sector 150 having notches 151 therein, and a poppet comprising a ball 152 acted on by a spring 153 is adapted to enter the notches 151 to hold the lever 145 and its connected parts in a plurality of different positions, which correspond to the low, neutral, second and high positions of the valve 123.

The valve piston 138 is controlled by a lever 154 on the exterior of the transmission which is connected by a shaft 155 with a lever 156. The lever 156 carries a pin 157 which enters a groove 158 in the piston 138. Oscillatory movement of the lever 154 through the linkage of the parts 155, 156 and 157 thus gives corresponding reciprocatory movement to the piston 138 between its neutral and reverse cross-over positions which are indicated in Fig. 8.

The three control levers 145, 154, and 78 for respectively operating the valve piston 123, the valve piston 138 and the sprag 76 and located on the exterior of the transmission case 36 are operated by means of a control lever 159 disposed beneath the steering wheel 160 of the vehicle. The lever 159 is mounted on the steering column 161 of the vehicle by means of a bearing 162 fixed to the column and a control shaft 163. The shaft 163 is movable rotatably and longitudinally in the bearing 162, and the control lever 159 which is fixed to the upper end of the shaft 163 may thus be moved arcuately about the center of the shaft 163 or may be moved toward the steering wheel 160 with a corresponding longitudinal movement of the shaft 163. The shift pattern of the control lever 159 is shown in Fig. 10, Fig. 10A showing the arcuate movement of the control lever between its reverse, low, neutral, second and high positions and Fig. 10B showing the longitudinal movement of the control lever 159 in being shifted between these positions just mentioned. It will be noted that the lever is moved in one plane between its low, neutral, second and high positions and is moved from its low position longitudinally into another plane in order to shift it to its reverse position.

The connections between the control column 163 and the levers 145, 154 and 78 comprise forked levers 164 and 165. A member 166 carried by the control column 163 is adapted to enter the fork of either of these levers, the member 166 being moved into such engagement with either of the levers by longitudinal movement of the control column 163 and operator's lever 159. After being so engaged with either of the levers 164 and 165, the lever so engaged is oscillated by the arcuate movement of the control column. The lever 165 is connected by means of a control rod 167 with a bell crank 168, and the bell crank is connected by means of a control rod 169 with the lever 145. The lever 164 is connected by means of a control rod 170 with a bell crank 171, and this crank is connected by means of a control rod 172 with the lever 78. The lever 154 is connected by means of a Bowden wire 173 with the end of the control column 163 so that the longitudinal movement of the rod causes a corresponding movement of the lever 154. A spring 174 is provided at the end of the column 163 for holding the control column in its longitudinal position corresponding to the low, neutral, second and high shift plane of the control lever 159. The lever 159 may be moved between its two shift planes against the action of the spring 174.

In the neutral condition of the transmission, the operator's control lever 159 is in its neutral position as indicated in Fig. 10. In this position of the lever 159, the valve pistons 123 and 138 are in their neutral positions in which they are illustrated in Fig. 8. Assuming that the vehicle is stationary, the pump 97 is inoperative since it is driven by the driven shaft 11 of the transmission; however, assuming the engine of the vehicle operative, fluid is discharged from the pump 96 from the sump 36b to the port 109 in the valve block 110. The check valve 100 is closed with the ball being seated in its position in which it is illustrated in Fig. 8, and fluid discharged from the pump 96 thus does not leak through the pump 97 back into the sump 36b to decrease the pressure supplied to the port 109. The pressure supplied to this port is maintained at a substantially predetermined value by the relief valve 104 in this condition of the transmission as well as in all the other power train completing conditions of the transmission. The piston 105 moves against the spring 107 to open the discharge port 108 in the valve 104 when the pressure in the port 109 increases above this predetermined value. Fluid under pressure from the port 109 enters the ports 126 of the sleeve 122 and thereby enters the internal cavity in the piston 123 through its ports 135. The ports 136 being in communication with the cavity also contain fluid under pressure but these ports are out of communication with any ports in the sleeve 122 in this position of the piston 123. Hence the fluid under pressure supplied to the cavity is not effective for engaging any of the clutches or brakes in the transmission in the neutral position of the operator's control lever 159.

It is contemplated that the transmission may be shifted directly from its neutral condition to its intermediate speed condition and that the low speed power train through the transmission may only be used in emergencies. The intermediate speed ratio, since it includes a drive by the torque converter 14, in general provides sufficient torque for a desirably fast acceleration of the vehicle. Hence the second or intermediate speed position of the control lever 159 has been placed next to its neutral position (see Fig. 10). The transmission is shifted from its neutral condition to its second or intermediate speed condition by moving the control lever 159 between these two positions, as indicated in Fig. 10.

The lever 159 is in its lower or low, neutral, second and high plane, and an arcuate movement of this lever between its neutral and second speed positions in this plane causes a movement of the lever 145 from its neutral to its second speed position by means of the links 167 and 169 and levers 165 and 168. The lever 145, being connected with the valve piston 123, causes a movement of this valve piston between its neutral and second speed positions. In the second speed position of the piston 123, the groove 133 in the piston is in communication with both the ports 125 and 126 and the ports 136 are in communication with the ports 129. Fluid under pressure thus flows from the port 109 through the ports 126, the groove 133, the ports 125, the passage 130, the ports 142, the groove 139, the ports 141 and the port 117 to the piston 55 for applying the friction clutch 17. Fluid under pressure also flows from the port 109 through the ports 135, 136, 129 and 114 to the brake-operating motor 75 for applying the friction brake 19. The clutch 17 and brake 19 being thus both engaged complete the intermediate speed power train between the shafts 10 and 11. The vehicle may be accelerated in this speed simply by opening the throttle of the vehicle, as will be apparent.

The transmission is shifted into high speed ratio from the intermediate speed ratio simply by moving the operator's shift lever 159 from its second to its high positions in its lower plane of movement. This movement of the shift lever has the effect of moving the shift lever 145 into its high position through the linkage connecting the levers 165 and 145. The valve piston 123 is moved by the lever 145 into the high position of the piston, and the piston in this position supplies fluid under pressure to the passage 130 and thereby to the clutch piston 55 for the clutch 17 through the same ports and passages of the valve 120 as in its second speed position. The piston 123 in this position connects the port 109, through the ports 126, the groove 133, the ports 135, 136, 128, the passage 131, the ports 144, the groove 140 and the ports 143 and 118 with the piston 60 for engaging the clutch 18. The two clutches 17 and 18 are thus engaged, and the transmission drives in high speed ratio from its drive shaft 10 to its driven shaft 11. The motor 75 for the friction brake 19 is drained in this position of the valve through the ports 114, 129 and 115 for disengaging this brake.

The transmission is shifted into low speed ratio by moving the operator's shift lever 159 into its low position as indicated in Fig. 10, and this has the effect of shifting the lever 145 and the piston 123 into their respective low positions. The piston 123 in this position applies fluid pressure to the brake motor 66 for engaging the friction brake 20 from the port 109 and through the ports 125, the groove 132 and the ports 124 and 112. The piston 123 in this position also applies fluid pressure to the clutch piston 55 for engaging the clutch 17, the application of fluid pressure being from the port 109 and through the ports 126, the groove 132, the ports 125, the passage 130, the ports 142, the groove 139 and the ports 141 and 117. The clutch 17 and the brake 20 being engaged, the transmission is now in low speed forward drive.

The transmission is shifted into reverse direction by moving the operator's shift lever 159 in the path indicated in Fig. 10B from its low to its reverse position, the path constituting a crossing over from the lower shift plane to the upper shift plane and thence an arcuate movement, as indicated, in the upper shift plane. For this movement of the lever 159, the levers 165 and 145 remain in their low speed positions and the valve piston 123 likewise remains in its low position. The valve piston 138 is moved from its neutral position to its reverse crossover position indicated in Fig. 8 by the crossover movement of the lever 159 from its lower to its upper shift plane. This movement of the lever 159 longitudinally with respect to the steering column 161 causes an upward movement of the control column 163 and the key 166 so that the key engages with the lever 164. This upward movement of the control column 163 causes, through the action of the Bowden wire 173 connected with the control column, a movement of the lever 154 from its neutral to its reverse position. The lever 154 is connected with the piston 138 as has been described, and a movement of this piston from its neutral to its reverse crossover position is thus completed.

For a conditioning for reverse drive as has been described, the valve piston 123 remains in its low speed position, and fluid under pressure thus remains applied to the brake motor 66 to maintain the friction brake 20 engaged, and fluid pressure is also directed from the valve 123 into the passage 130. When the piston 138 is in its reverse cross-over position, the fluid pressure in the passage 130 is directed by the valve piston 138 to the piston 60 to engage the friction clutch 18 instead of to the piston 55 for the clutch 17 as was the case in low speed drive. The passage 130 is connected with the piston 60 through the ports 142, the groove 139 and the ports 143. Thus by this movement from its low speed position to its upper shift plane, the control lever 159 has caused an engagement of the clutch 18 with the brake 20 remaining engaged, and the reverse drive power train is thus completed. The fluid cavity 54 for the piston 55 is drained of fluid in this position of the valve 138 through the ports 117, 141, and 116.

The reaction on the drum 65 connected with the carrier 46 is greater for reverse drive than it is for low speed forward drive, and for this reason the positive brake 21 which operates in parallel with the friction brake 20 is provided, and additional movement of the shift lever 159 in its upper plane to its reverse position as indicated in Fig. 10B, causes an engagement of the positive brake. This movement of the shift lever 159 in its upper plane causes movement of the lever 164 and thereby the transmission lever 78 connected to the lever 164 by means of the control rods 170 and 172 and the bell crank 171. The lever 78 is thus moved from its neutral to its reverse position as shown in Fig. 9, thereby causing a movement of the lever 80 and the plunger 81 carrying the pin 83 through the action of the spring 82. This movement of the pin 83 causes the sprag 76 to move into engagement with the teeth 77, and the positive brake 21 is thus engaged. If there should be any butt ending of the sprag 76 with one of the teeth 77 without any complete engagement, the spring 82 allows a full movement of the levers 80 and 78, and the spring will cause a full engagement on subsequent rotative movement of the drum 65 due to the reaction on this drum by the action of the gear set 16 in driving the shaft 11 in the reverse direction. The friction brake 20 and the positive brake 21 are thus both effective for reverse drive, and, as has been described, the brake 20 is engaged in shifting the lever 159 to its low position from its neutral position in the lower shaft plane and the brake 21 is engaged in shifting the lever to its reverse position in its upper shift plane.

A modified control arrangement which is shown particularly in Figs. 11 and 12 may also be used in connection with the illustrated transmission. The modified control arrangement comprises a valve block 175 having valves 176 and 177 therein. The valve block 175 is provided with ports 178, 179, 180, 181, 182, 183, 184, 185, 186, 187, 188, and 189. The ports 178, 181, 182, 183, 186, 187 and 188 are "bleed" ports which drain to the sump 36b of the transmission, and the ports 179, 180, 184, 185 and 189 are respectively connected with the brake motor 66, the source of oil pressure, the clutch piston 55, the clutch piston 60 and the brake motor 75.

The valve 176 comprises a valve sleeve 190 and a valve piston 191. The valve 177 comprises a valve sleeve 192 and a valve piston 193. The valve pistons 191 and 193 have slots 194 and 195 formed respectively therein. The valves 176 and 177 are generally similar to the two valves 120 and 121 in the first embodiment of the invention, and the valve pistons 191 and 193 are connected in the same manner with the transmission levers 145 and 154 respectively as are the valve pistons 123 and 138 with the slots 194 and 195 being used for connective purposes in the same manner as are the slots 149 and 158.

The valve sleeve 190 is provided with ports 196, 197, 198, 199 and 200, and these ports are respectively connected with the port 179, a passage 201 in the valve block 175, the port 180, the port 181 and a passage 202 in the valve block. The piston 194 is provided with grooves 203, 204, and 205, and is provided with ports 206 and 207 connected to a central cavity in the valve piston. The valve sleeve 192 is provided with ports 208, 209, 210 and 211 and these ports are respectively connected with the port 184, the passage 201, the port 185 and a passage 212 in the valve block. The piston 193 is provided with grooves 213 and 214.

A third valve 215 is provided in the valve block 175, this valve comprising a sleeve 216 and a piston 217. The sleeve 216 is provided with ports 218, 219, 220, 221 and 222, and these ports are respectively connected with the port 187, the passage 212, the passage 202, the port 189 and the port 188. The piston 217 is provided with grooves 223 and 224 as shown.

The valve piston 217 is connected to an armature 225 of an electric solenoid 226. The armature is utilized for moving the valve piston 217 from its second speed position in which it is illustrated downwardly as seen in the drawing to its direct drive or high position when the solenoid is energized, and a spring 227 is provided between the solenoid and piston for yieldably holding the piston in its illustrated second speed position. The solenoid comprises an energizing coil 228 and a holding coil 229, and when these coils are both energized, the armature is drawn into its energized position which corresponds to the direct drive position of the piston 217. The solenoid 226 also comprises a switch 230 which is closed in the deenergized condition of the solenoid and which is opened when the armature 225 moves to its energized position.

The solenoid 226 is connected in an electric circuit shown in Fig. 12. The electric circuit comprises a governor 231 which may be driven by any suitable gearing 232 (see Fig. 11) from the driven shaft 11. The governor comprises a switch 233 which is closed upon the speed of the driven shaft 11 reaching a predetermined value. The electric circuit also comprises a kickdown switch 234 under the control of the accelerator 235 of the vehicle such that when the accelerator 235 is moved to its extreme open throttle position, the switch 234 is opened. The circuit also includes a manifold switch 236 under the control of a diaphragm motor 237. The motor includes a diaphragm 238 connected with the switch and acted on by a spring 239. The motor is connected with the manifold (not shown) of the internal combustion engine driving the vehicle by means of a conduit 240. The action of the motor 237 is such that when the vacuum in the manifold increases to a predetermined value corresponding to a closed throttle position of the accelerator 235, the diaphragm 238 is moved upwardly against the action of the spring 239 to close the switch 236.

The switches 233, 234, and 236 are connected in series with the winding 241 of a relay 242 and also in series with a fuse 243, the ignition switch 244 of the vehicle and with the battery 245 of the vehicle. The relay 242 comprises the winding 241 on a core 246 and an armature 247 which is attracted to the core 246 when the winding 241 is energized. The relay comprises two sets of contacts 248 and 249 with one contact of each set being carried by the armature. One of the contacts 248 is connected with the upper end of the winding 241 and the other contact 248 is connected with the coils 228 and 229 of the solenoid 226. The coils 228 and 229 are connected in parallel, and the coil 228 is connected in series with the switch 230 previously described. One of the contacts 249 is connected to the lower end of the winding 241 and the other contact 249 is connected to that point in the circuit between the switches 234 and 236.

The transmission is shifted from neutral into its intermediate speed ratio, its low speed ratio or its reverse in the same manner as with the controls first described. The control lever 159, as has been described, is connected by means of the levers 145 and 154, respectively, with the valve pistons 191 and 193, and these valve pistons are moved to their indicated positions by means of the lever 159 in order to shift the transmission into these speed ratios. The shift into high speed ratio is made by means of the electrical circuit just described and the control 159 and the lever 145 for this embodiment of the invention do not have a high speed position but are allowed to remain in their second or intermediate speed positions corresponding to the forward speed position of the valve piston 191 which is indicated, and the electrical circuit may then be utilized to complete the shift from the intermediate speed ratio to high speed ratio.

In the neutral position of the piston 191, the port 180 which is connected to the source of oil pressure which may be the same as that with which the port 109 is connected in the first embodiment supplies fluid under pressure to the ports 204, 206, and 207, but since these ports are out of communication with other ports, this fluid pressure is not effective for engaging any of the friction couplings, including brakes and clutches, in the transmission. When the valve piston 191 is moved into its low position, the port 180 is in communication with the port 179 connected to the brake motor 66 by means of the ports 198, the groove 203, and the ports 196, and the friction brake 20 is thus applied. In this position of the piston 191, fluid pressure is also supplied to the conduit 201, the communication between the conduit 201 and the port 180 being by means of the ports 198, the groove 203 and the ports 197. The passage 201 is connected to the clutch piston 55 through the ports 209, the groove 213 of the piston 193 and the ports 208 and 184. The friction brake 20 and the friction clutch 17 are thus applied for low speed forward drive.

The valve piston 191 remains in the same position for reverse as for low speed forward drive, similar to the valve piston 123 in the first embodiment, and the valve piston 193 is moved from its neutral to its reverse cross-over position in the same manner that the valve piston 138 is moved in the first embodiment of the invention. With the valve pistons 191 and 193 being in these conditions, fluid under pressure is applied to the brake motor 66 and to the conduit 201 in the same manner as in low speed forward drive. The conduit 201 with the piston 193 being in its reverse position is connected to the clutch piston 60 instead of the clutch piston 55, this connection being by means of the ports 209, the groove 213 and the ports 210 and 185. The clutch 18 and the brake 20 are thus applied to complete the reverse drive power train, and the positive brake 21 is applied in the same manner as in connection with the first embodiment of the controls.

The transmission is shifted into second speed drive in the same manner as with the first embodiment, namely, by shifting the control lever 159 to its intermediate speed position, and this has the effect of moving the piston 191 to its forward or intermediate speed position. The valve piston 193 remains in its neutral position as will be understood. With the valve pistons 191 and 193 being in these positions, fluid under pressure is applied to the conduit 201, the connection between the port 180 and the passage 201 being through the ports 198, the groove 204 and the ports 197, and the fluid from the passage 201 is applied to the clutch piston 55 through the ports 209, the groove 213 and the ports 208 and 184 for engaging the clutch 17. Fluid under pressure is supplied to the passage 202 from the valve 176, and this connection is made from the port 180, and through the ports 206, 207 and 200. The port 189 is connected to the passage 202 by means of the ports 220, the groove 224 in the valve 215 and the ports 221, and the port 189 being connected with the brake motor 75, the brake 19 is applied. Since both the clutch 17 and the brake 19 are applied, the transmission is in second or intermediate speed drive.

In order to shift the transmission from intermediate speed to high speed, the circuit through the relay 242 is completed, and this is done by releasing the accelerator 235 sufficiently so that the switch 236 is closed due to the increase in manifold vacuum. In order for this operation to be effective to upshift the transmission, the shaft 11 must be rotating at a predetermined speed sufficient to close the governor switch 233. Assuming the ignition switch 244 to be closed, as it is when the vehicle is being driven, a circuit is thus completed through the relay winding 241 and the switches 236, 234 and 233. The core 246 is thus magnetized, and the armature 247 is drawn to its energized position to close the contacts 248 and 249. Closing of the contacts 249 completes a circuit in parallel with the switch 236, and thereafter, regardless of any opening of the switch 236 due to an opening of the vehicle throttle, the relay 242 nevertheless remains energized, the lower end of the winding 241 being connected through the contacts 249 with the switch 234. Closure of the contacts 248 completes a circuit from the battery 245 and through the ignition switch to the windings 228 and 229. The armature 225 of the solenoid 226 is then moved to its energized position, and in this position it opens the contacts 230 which are in series with the winding 228. The winding 229 is sufficient to hold the armature 225 thereafter in its energized position. This shifting of the piston 217 from its second to its high position which are indicated in Fig. 11 functions to shift the transmission into high speed ratio.

In the high speed ratio the clutch 17 remains engaged since the valve 215 does not interrupt the fluid pressure delivered to the piston 55 through the passage 201; however, the shifting of the valve piston 217 interrupts the supply of fluid pressure to the brake motor 75 and instead applies it to the piston 60 for the clutch 18. In its high position, the valve piston 217 connects the passages 202 and 212 (the fluid under pressure remains within the passage 202 in high speed condition of the transmission since the piston 191 is not shifted), and the connection between the passages 202 and 212 is through the ports 220, the groove 223 and the ports 219. The passage 212 is connected to the piston 60 through the ports 211, the groove 214 and the ports 210 and 185, and the clutch 18 is thus applied. The clutches 17 and 18 thus being both applied, the transmission is in direct drive. Brake motor 75 is drained of fluid through ports 189 and 221, groove 224, and ports 222 and 188 for disengaging the brake 19 on such an upshift from intermediate to high speed ratio.

The transmission may be downshifted from direct drive to intermediate speed ratio by moving the accelerator 235 to a fully open throttle kickdown position. Movement of the throttle 235 to this position opens the switch 234 and breaks the circuit through the winding 241 of the relay 242. The relay 242 is thus deenergized, and the contacts 248 open. The holding coil 229 is thus deenergized, and the armature 225 and the connected valve piston 217 moved back to their second speed positions under the action of the spring 227. Second speed drive then obtains in the same manner as has been described.

My transmission advantageously includes both a friction brake 20 and a positive brake 21 for the planet gear carrier 46 of the planetary gear set 16. Thus the extra reaction which is put on the gear carrier as the reaction element of the gear set are taken without any slippage of the braking mechanism provided. The shift pattern of the manual shift lever 159 advantageously is such that the positive brake is engaged after the friction brake has been engaged and after the reverse power train through the transmission has previously been completed. I provide an advantageous hydraulic system for controlling the transmission including one valve for shifting the transmission between its forward speed ratios and a second valve for completing the reverse drive power train through the transmission. The first valve is controlled by the shift lever 159 when moved in a single plane and the other valve is controlled when the shift lever is moved between this plane and another plane parallel to the first plane. In the second embodiment of the controls for my transmission a third valve is provided under the control of the accelerator of the vehicle, this third valve shifting the transmission between its intermediate and high speed ratios.

I wish it to be understood that my invention is not to be limited to the specific constructions and arrangements shown and described, except only insofar as the claims may be so limited, as it will be apparent to those skilled in the art that changes may be made without departing from the principles of the invention. In construing the appended claims, I wish it to be understood that where I specify a coupling or a positive or friction coupling, I mean to include by these expressions not only a clutch in which two rotative parts are coupled together, but I also intend to include within the purview of this expression a brake in which a stationary part is coupled to a movable part.

I claim:

1. In a transmission, the combination of a drive shaft, a driven shaft, a planetary gear set for providing a forward drive power train between said shafts and a reverse drive power train between the shafts, said gear set having a single reaction element adapted to be held stationary for completing both of said power trains, the reaction on said reaction element being greater for reverse drive than for forward drive, means for shifting the transmission either into its said forward drive or into its said reverse drive, and a friction brake and a positive brake for said reaction element, said shifting means being operative to engage said friction brake for said forward drive and to engage both of said brakes for said reverse drive.

2. In a transmission, the combination of a drive shaft, a driven shaft, a planetary gear set for providing a forward drive power train and a reverse drive power train between said shafts, said planetary gear set having a reaction element adapted to be held stationary for both of said drives and having two different other elements connectible with one of said shafts for providing either of the drives, a clutch for connecting each of said two last-named elements with said last-named shaft, the reaction on said reaction element being greater for reverse drive than for forward drive, a friction brake and a positive brake for said reaction element, and means for shifting the transmission either into its said forward drive or into its said reverse drive by engaging one of said clutches and said friction brake for forward drive and by engaging the other of said clutches and both of said brakes for reverse drive.

3. In a transmission, the combination of a drive shaft, a driven shaft, a planetary gear set for providing a forward drive power train and a reverse drive power train between said shafts, said gear set comprising a ring gear connected with said driven shaft, planet gears, a carrier for the planet gears and two sun gears, a clutch for connecting each of said sun gears selectively with said drive shaft and one of the clutches being engaged for forward drive and the other for reverse drive, said gear carrier constituting the reaction element of the gear set adapted to be held stationary, the reaction on the gear carrier being greater for reverse drive than for forward drive, a friction brake and a positive brake for said gear carrier, and means for shifting the transmission to either its reverse drive or its forward drive and including means for engaging said friction brake for forward drive and for engaging both of said brakes for reverse drive.

4. In transmission mechanism, the combination of a drive shaft, a driven shaft, means for providing a forward drive and a reverse drive between the shafts and the transmission mechanism having a neutral condition, a shift lever adapted to be manually actuated for shifting the transmission mechanism between its neutral, forward and reverse drive conditions and being movable in two planes, said first-named means including fluid pressure actuated mechanism for providing said forward and reverse drives, a source of fluid pressure, two valves one being connected between the fluid pressure source and the transmission mechanism to provide the forward drive when shifted and the other being connected between the fluid pressure source and transmission mechanism to provide said reverse drive after the said shifting of the other valve, and means connecting said shift lever with said valves whereby said first-named valve is moved when the shift lever is moved in an arc of movement in one plane and the other valve is subsequently moved when the shift lever is moved in another plane.

5. In transmission mechanism, the combination of a drive shaft, a driven shaft, means for providing a forward drive and a reverse drive between said shafts and the transmission mechanism having a neutral condition, said means including fluid pressure responsive means for providing the forward and reverse drives, a source of fluid pressure, two valves effectively between said fluid pressure source and said means, one of said valves being shiftable to provide the forward drive and the other valve being subsequently shiftable with the first valve remaining in its shifted position to provide the reverse drive, and a shift lever adapted for manual actuation connected to said valves and being movable in two planes at right angles to each other, one of said planes having positions of the shift lever corresponding to forward drive and neutral conditions of the transmission mechanism and said lever being connected with said first-named valve to move the valve between these positions of the shaft lever, said shift lever being connected with the other valve to move the latter valve to its reverse position when moved in the other plane.

6. In transmission mechanism, the combination of a drive shaft, a driven shaft, means for providing a forward drive and a reverse drive power train between said shafts and including a planetary gear set having a reaction element, a clutch for connecting one of said shafts with an element of said gear set and a second clutch for connecting said shaft with another element of said gear set, said clutches providing the forward and reverse drives through the gear set when said reaction element is held stationary, a friction brake and a positive brake for said reaction element, and a manual control operatively connected with said brakes for applying said friction brake and the clutch for forward drive when the manual control is given a movement and for releasing this clutch and for applying the other clutch for reverse drive when the control is given a subsequent movement and for applying the positive brake when the control is given a further subsequent movement.

7. In transmission mechanism, the combination of a drive shaft, a driven shaft, a planetary gear set for providing a forward and a reverse drive between said shafts, said gear set comprising a reaction element, clutches for connecting two other elements of said gear set with one of said shafts for providing a forward and a reverse drive between the shafts when said reaction element is held stationary, a friction brake and a positive brake for said reaction element, fluid pressure means for applying said clutches and said friction brake, a source of fluid pressure, a manual control for the transmission mechanism, a pair of valves effectively between said fluid pressure source and said fluid pressure responsive means, said manual control being connected with both of said valves such that when the manual control is moved in one plane it moves one of said valves for applying said friction brake and one of said clutches for completing the forward speed drive and when subsequently moved in a plane substantially at right angles thereto it actuates the other valve to disengage the last-named clutch and engage the other clutch to complete the reverse drive, said manual control being connected with said positive brake and when subsequently moved in a plane parallel with the first-named plane it engages the positive brake.

8. In a transmission for an automotive vehicle, the combination of a drive shaft, a driven shaft, means providing low, intermediate and high speed ratios between said shafts, fluid pressure responsive means for completing each of said speed ratios, a source of fluid pressure, and a pair of valves effectively between said fluid pressure source and said fluid pressure responsive means, one of said valves being effective for causing a completion of said low and intermediate speed ratios and having a position corresponding to each of these ratios, a manual control for said last-named valve, the other of said valves being connected with said fluid source by the first-named valve in its intermediate speed position and being thereafter effective for shifting the transmission into high speed ratio when actuated, an accelerator for the vehicle, and means under the control of said accelerator for actuating and deactuating said last-named valve for shifting the transmission into and out of its high speed ratio.

9. In transmission mechanism for an automotive vehicle, the combination of a drive shaft, a driven shaft, a planetary gear set having a ring gear connected with said driven shaft, two sun gears, planet gears, and a planet gear carrier, a friction clutch for connecting one of said sun gears with said drive shaft, a friction clutch for connecting the other of said sun gears with said drive shaft, a friction brake for said gear carrier, a friction brake for said last-named sun gear, a low speed power train being completed when said brake for said carrier and said first-named clutch are engaged, an intermediate speed power train being completed when said first-named clutch and said second-named brake are engaged and a high speed power train being completed when both of said clutches are engaged, fluid pressure responsive means for engaging each of said friction clutches and said friction brakes, a source of fluid pressure, a pair of valves effectively between said fluid pressure source and said fluid pressure responsive means, a manual control for one of said valves, said last-named valve so connecting said fluid pressure source and said fluid pressure responsive means as to complete said low and intermediate speed power trains and having a position corresponding to each of these power trains, said other valve when actuated while said first-named valve is in its intermediate speed position so connecting said fluid pressure source and said fluid pressure responsive means as to complete said high speed power train, an accelerator for the vehicle, and means for actuating said second-named valve in accordance with positions of said accelerator for completing and braking said high speed power train.

10. In a transmission mechanism for an automotive vehicle, the combination of a drive shaft, a driven shaft, means for providing a relatively low speed drive and a high speed drive between said shafts, an internal combustion engine for the vehicle and having a manifold, a vacuum motor connected with said manifold and responsive to vacuum conditions therein, an accelerator for said engine, a governor responsive to the speed of said driven shaft, a vacuum motor controlled switch adapted to be closed when the vacuum in said manifold increases to a predetermined value, a normally closed accelerator controlled switch adapted to be opened when the accelerator is moved to an open throttle position, a governor controlled switch adapted to be closed when the driven shaft speed increases to a predetermined value, and an electrical circuit including all of said switches connected in series for upshifting the transmission mechanism from said low speed ratio to said high speed ratio on an increase in vacuum in said manifold to a predetermined value above a predetermined speed of said output shaft and for subsequent downshifting the mechanism to said low speed ratio on a movement of said accelerator to said open throttle position.

11. In a transmission mechanism for an automotive vehicle, the combination of a drive shaft, a driven shaft, means for providing a relatively low speed drive and a high speed drive between said shafts, an internal combustion engine for the vehicle and having a manifold, the vacuum in the manifold varying in value according to the position of the accelerator and increasing when the accelerator is released to a closed throttle position, and a vacuum motor connected with said manifold, a vacuum motor controlled switch adapted to be closed when the vacuum in said manifold increases to a predetermined value, an electric circuit including said switch for upshifting said transmission mechanism from said low speed ratio to said high speed ratio when said switch is closed on an increase in vacuum in said manifold due to a release of said accelerator to a closed throttle position, and means for subsequently keeping the transmission mechanism in said high speed ratio regardless of a decrease of vacuum in said manifold due to a movement of the accelerator to an open throttle position.

12. In a transmission mechanism for an automotive vehicle, the combination of a drive shaft, a driven shaft, means for providing a relatively low speed drive and a high speed drive between said shafts, an internal combustion engine for the vehicle having an accelerator and having a manifold in which vacuum therein increases upon movement of the accelerator toward a closed throttle position, a vacuum motor connected with said manifold and responsive to vacuum conditions therein, means for operatively connecting the transmission mechanism and the vacuum motor whereby the motor functions to control the mechanism to upshift it from said low speed ratio to said high speed ratio when the vacuum in the manifold increases to a predetermined value due to movement of said accelerator to a closed throttle position, and electrical relay means for subsequently keeping the transmission mechanism in said high speed ratio regardless of a decrease in vacuum in said manifold due to the movement of the accelerator to an open throttle position.

13. In a transmission mechanism for an automotive vehicle, the combination of a drive shaft, a driven shaft, means for providing a relatively low speed drive and a high speed drive between said shafts, an internal combustion engine for the vehicle having an accelerator and having a manifold in which vacuum therein increases upon movement of the accelerator toward a closed throttle position, a vacuum motor connected with said manifold and responsive to said vacuum conditions therein, a vacuum motor controlled switch adapted to be closed when the vacuum in said manifold increases to a predetermined value, a normally closed accelerator controlled switch adapted to be opened upon movement of said accelerator to an open throttle position, an electric circuit including said switches connected in series for upshifting the transmission mechanism from said low speed ratio to said high speed ratio on an increase in the vacuum in said manifold to a predetermined value due to movement of said accelerator to said closed throttle position, and means for subsequently keeping the transmission mechanism in said high speed ratio regardless of a decrease of vacuum in said manifold due to a movement of the accelerator toward an open throttle position, said circuit being effective to downshift the transmission mechanism from said high speed ratio to said low speed ratio on a movement of the accelerator to a full open throttle position whereby said accelerator controlled switch is opened.

14. In a transmission mechanism for an automotive vehicle, the combination of a drive shaft, a driven shaft, means for providing a relatively low speed drive and a high speed drive between said shafts, an internal combustion engine for the vehicle and having a manifold, the vacuum in the manifold varying in value according to the position of the accelerator and increasing when the accelerator is released to a closed throttle position, a vacuum motor connected with said manifold, means operatively connecting the vacuum motor and the transmission mechanism for upshifting said mechanism from said low speed ratio to said high speed ratio on an increase in vacuum in said manifold due to a release of said accelerator to a closed throttle position, and a relay rendered effective upon establishment of said high speed ratio for subsequently keeping the transmission mechanism in said high speed ratio regardless of a decrease of vacuum in said manifold due to a movement of the accelerator to an open throttle position.

15. In a transmission mechanism for an automotive vehicle, the combination of a drive shaft, a driven shaft, means for providing a relatively low speed drive and a high speed drive between said shafts, an internal combustion engine for the vehicle having an accelerator and having a manifold in which vacuum therein increases upon movement of the accelerator toward a closed throttle position, a vacuum motor connected with said manifold and responsive to vacuum conditions therein, an electric switch controlled by said motor and adapted to be closed when the vacuum in said manifold increases to a predetermined value, a normally closed accelerator controlled switch adapted to be opened upon movement of said accelerator to an open throttle position, and an electrical circuit including said vacuum motor controlled switch and said accelerator controlled switch connected in series for upshifting the transmission mechanism from said low speed ratio to said high speed ratio on the closure of both of said switches upon an increase of the vacuum in said manifold to a predetermined value due to movement of said accelerator to said closed throttle position and for downshifting the transmission mechanism from said high speed ratio to said low speed ratio upon the opening of said accelerator controlled switch on a movement of the accelerator to said open throttle position.

References Cited in the file of this patent

UNITED STATES PATENTS

| Number | Name | Date |
|---|---|---|
| 799,290 | Austin | Sept. 12, 1905 |
| 1,353,438 | Underhill | Sept. 21, 1920 |
| 1,435,430 | Thompson | Nov. 14, 1922 |
| 1,771,228 | Morici | July 22, 1930 |
| 1,843,193 | Banker | Feb. 2, 1932 |
| 1,991,124 | Sharpe | Feb. 12, 1935 |
| 2,132,728 | Ford | Oct. 11, 1938 |
| 2,173,648 | Dunn | Sept. 19, 1939 |
| 2,220,174 | Ravigneaux | Nov. 5, 1940 |
| 2,229,345 | Schotz | Jan. 21, 1941 |
| 2,231,966 | Swennes | Feb. 18, 1941 |
| 2,263,141 | Peterson | Nov. 18, 1941 |
| 2,292,633 | Griswold | Aug. 11, 1942 |
| 2,329,724 | Maurer | Sept. 21, 1943 |
| 2,332,593 | Nutt et al. | Oct. 26, 1943 |
| 2,360,646 | Carnagua | Oct. 17, 1944 |
| 2,368,684 | Simpson | Feb. 9, 1945 |
| 2,374,303 | Osborne | Apr. 24, 1945 |
| 2,380,717 | Beltz | July 31, 1945 |
| 2,407,289 | La Brie | Sept. 10, 1946 |
| 2,444,953 | Polomski | July 13, 1948 |
| 2,548,138 | Ball | Apr. 10, 1951 |
| 2,568,958 | Hey et al. | Sept. 25, 1951 |
| 2,645,137 | Roche | July 14, 1953 |

FOREIGN PATENTS

| Number | Country | Date |
|---|---|---|
| 471,394 | Great Britain | Sept. 6, 1937 |
| 154,694 | Great Britain | Nov. 30, 1920 |
| 809,102 | France | Feb. 24, 1937 |
| 48,019 | France | Oct. 16, 1937 |
| | (Add to No. 809,102) | |